US007353298B2

(12) United States Patent
Hayasaka

(10) Patent No.: US 7,353,298 B2
(45) Date of Patent: Apr. 1, 2008

(54) DATA TRANSFER PROCESSING METHOD

(75) Inventor: Kazumi Hayasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/344,160

(22) Filed: Feb. 1, 2006

(65) Prior Publication Data

US 2006/0129705 A1 Jun. 15, 2006

Related U.S. Application Data

(63) Continuation of application No. PCT/JP03/09852, filed on Apr. 8, 2003.

(51) Int. Cl.
*G06F 3/00* (2006.01)

(52) U.S. Cl. ............................. 710/15; 710/52; 710/57

(58) Field of Classification Search ..................... None
See application file for complete search history.

(56) References Cited

U.S. PATENT DOCUMENTS

| | | | | |
|---|---|---|---|---|
| 5,581,545 | A * | 12/1996 | Moritomo | 370/237 |
| 6,081,843 | A * | 6/2000 | Kilkki et al. | 709/232 |
| 6,327,249 | B1 * | 12/2001 | Cookman et al. | 370/235 |

FOREIGN PATENT DOCUMENTS

| | | |
|---|---|---|
| JP | 11-103330 | 4/1999 |
| JP | 11-134289 | 5/1999 |
| JP | 2002-229932 | 8/2002 |
| JP | 2003-087255 | 3/2003 |
| JP | 2003-099390 | 4/2003 |
| JP | 2003-114865 | 4/2003 |

* cited by examiner

*Primary Examiner*—Kim Huynh
*Assistant Examiner*—Dean Phan
(74) *Attorney, Agent, or Firm*—Staas & Halsey LLP

(57) ABSTRACT

Processing which, in conventional data transfer processing, entails the use of the common bus when performing (1) processing to confirm the interrupt state, performed via the common bus employing an interrupt register and interrupt mask register, and (2) confirmation processing performed when new frames are transferred during processing, can be performed without using the common bus. By thus reducing the frequency of access via the common bus in data transfer processing, there is no reduction in the usage ratio of the common bus by other peripheral device connected to the same common bus as certain peripheral device. As a result, the performance of the information processing terminal as a whole is not degraded. Further, even if there is currently only a single peripheral device unit connected to the common bus, degradation of the performance of the information processing terminal upon future addition of other peripheral device can be avoided.

2 Claims, 10 Drawing Sheets

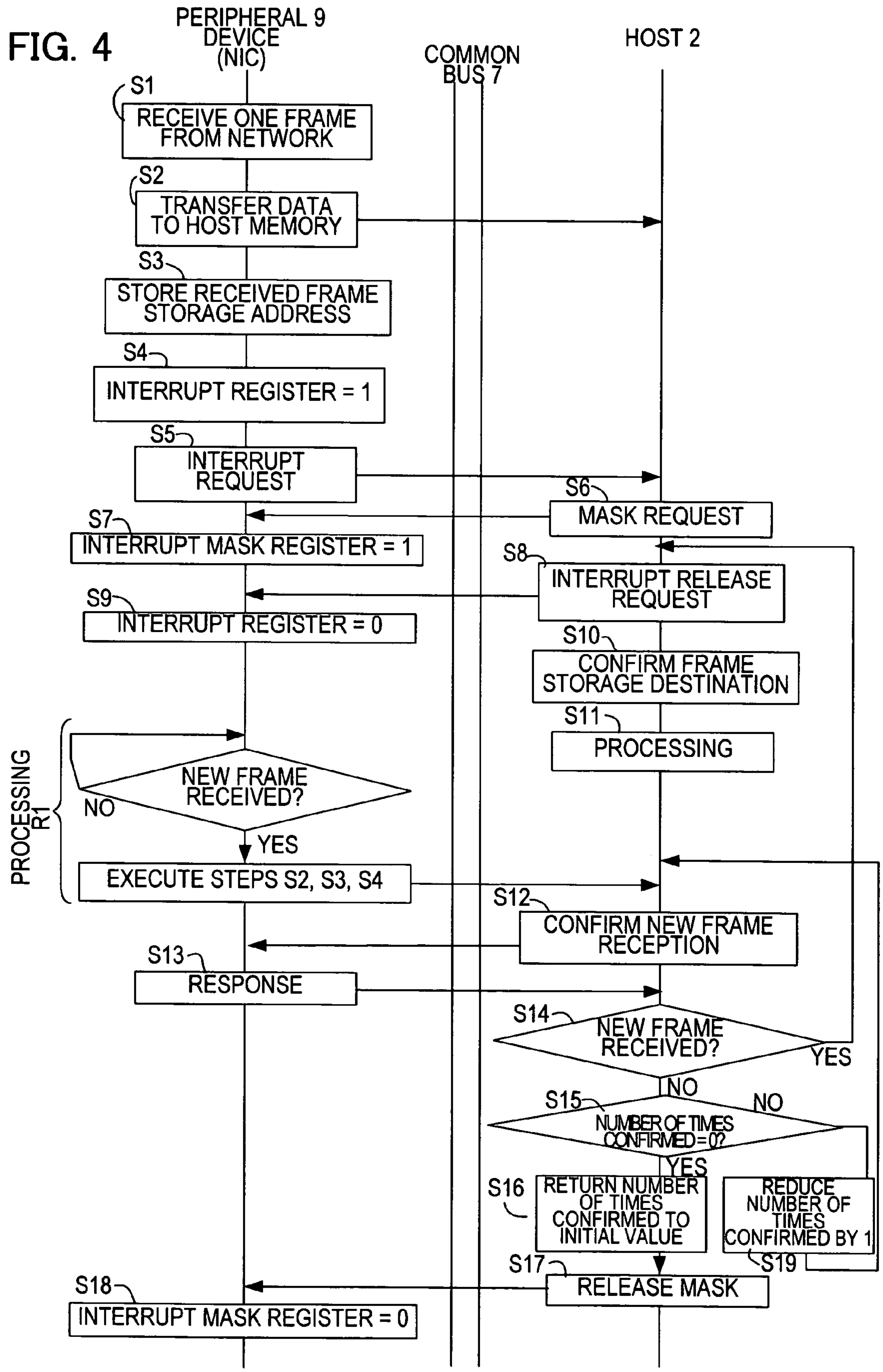
FIG. 4
PERIPHERAL DEVICE (NIC) 9
COMMON BUS 7
HOST 2
S1
RECEIVE ONE FRAME FROM NETWORK
S2
TRANSFER DATA TO HOST MEMORY
S3
STORE RECEIVED FRAME STORAGE ADDRESS
S4
INTERRUPT REGISTER = 1
S5
INTERRUPT REQUEST
S6
MASK REQUEST
S7
INTERRUPT MASK REGISTER = 1
S8
INTERRUPT RELEASE REQUEST
S9
INTERRUPT REGISTER = 0
S10
CONFIRM FRAME STORAGE DESTINATION
S11
PROCESSING
PROCESSING R1
NEW FRAME RECEIVED?
NO
YES
EXECUTE STEPS S2, S3, S4
S12
CONFIRM NEW FRAME RECEPTION
S13
RESPONSE
S14
NEW FRAME RECEIVED?
YES
NO
S15
NUMBER OF TIMES CONFIRMED = 0?
NO
YES
S16
RETURN NUMBER OF TIMES CONFIRMED TO INITIAL VALUE
REDUCE NUMBER OF TIMES CONFIRMED BY 1
S19
S17
RELEASE MASK
S18
INTERRUPT MASK REGISTER = 0

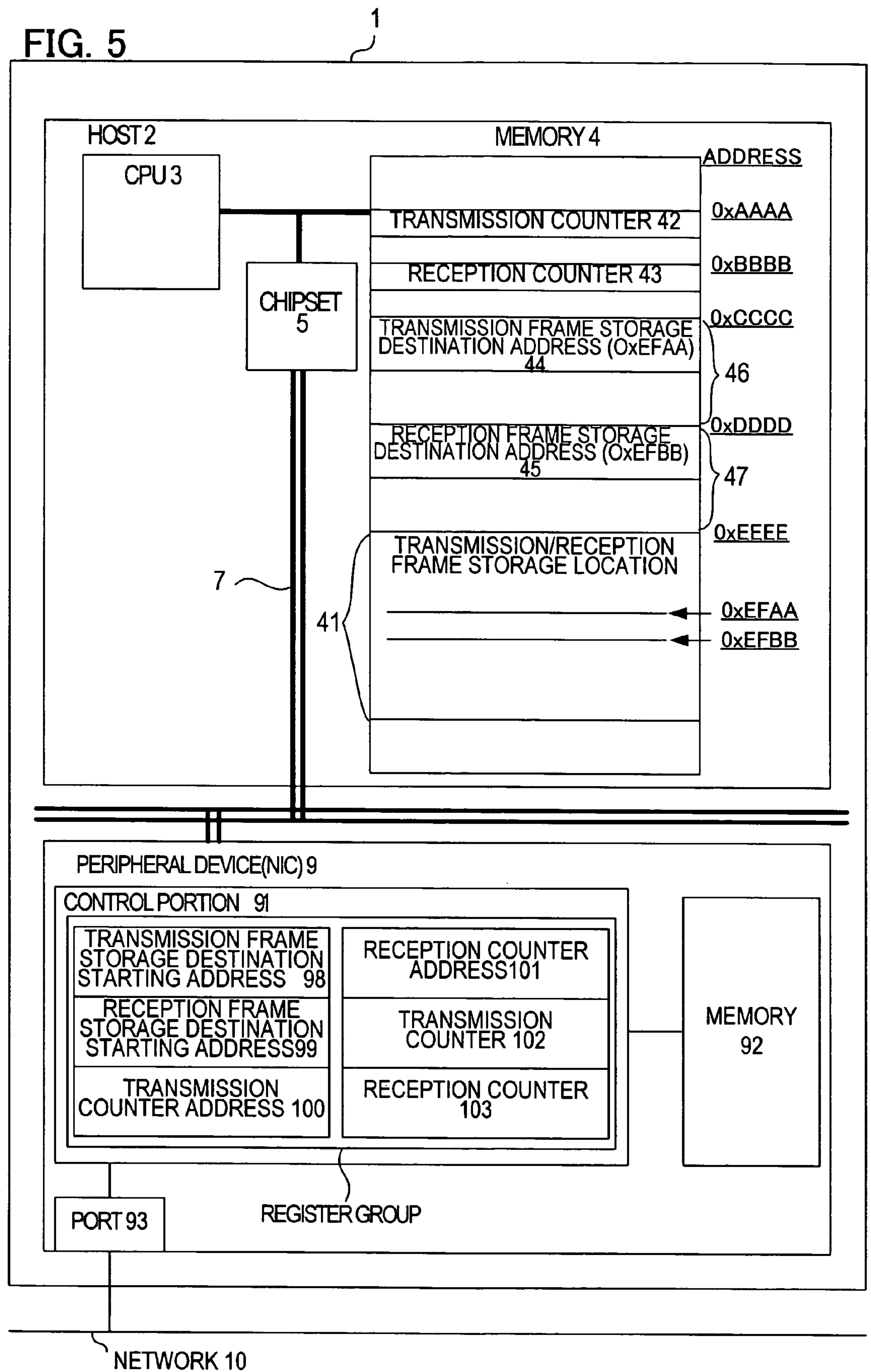
FIG. 5
1
HOST 2
CPU 3
CHIPSET 5
MEMORY 4
ADDRESS
TRANSMISSION COUNTER 42
0xAAAA
RECEPTION COUNTER 43
0xBBBB
0xCCCC
TRANSMISSION FRAME STORAGE DESTINATION ADDRESS (OxEFAA) 44
46
0xDDDD
RECEPTION FRAME STORAGE DESTINATION ADDRESS (OxEFBB) 45
47
0xEEEE
TRANSMISSION/RECEPTION FRAME STORAGE LOCATION
7
41
0xEFAA
0xEFBB
PERIPHERAL DEVICE(NIC) 9
CONTROL PORTION 91
TRANSMISSION FRAME STORAGE DESTINATION STARTING ADDRESS 98
RECEPTION FRAME STORAGE DESTINATION STARTING ADDRESS99
TRANSMISSION COUNTER ADDRESS 100
RECEPTION COUNTER ADDRESS101
TRANSMISSION COUNTER 102
RECEPTION COUNTER 103
MEMORY 92
PORT 93
REGISTER GROUP
NETWORK 10

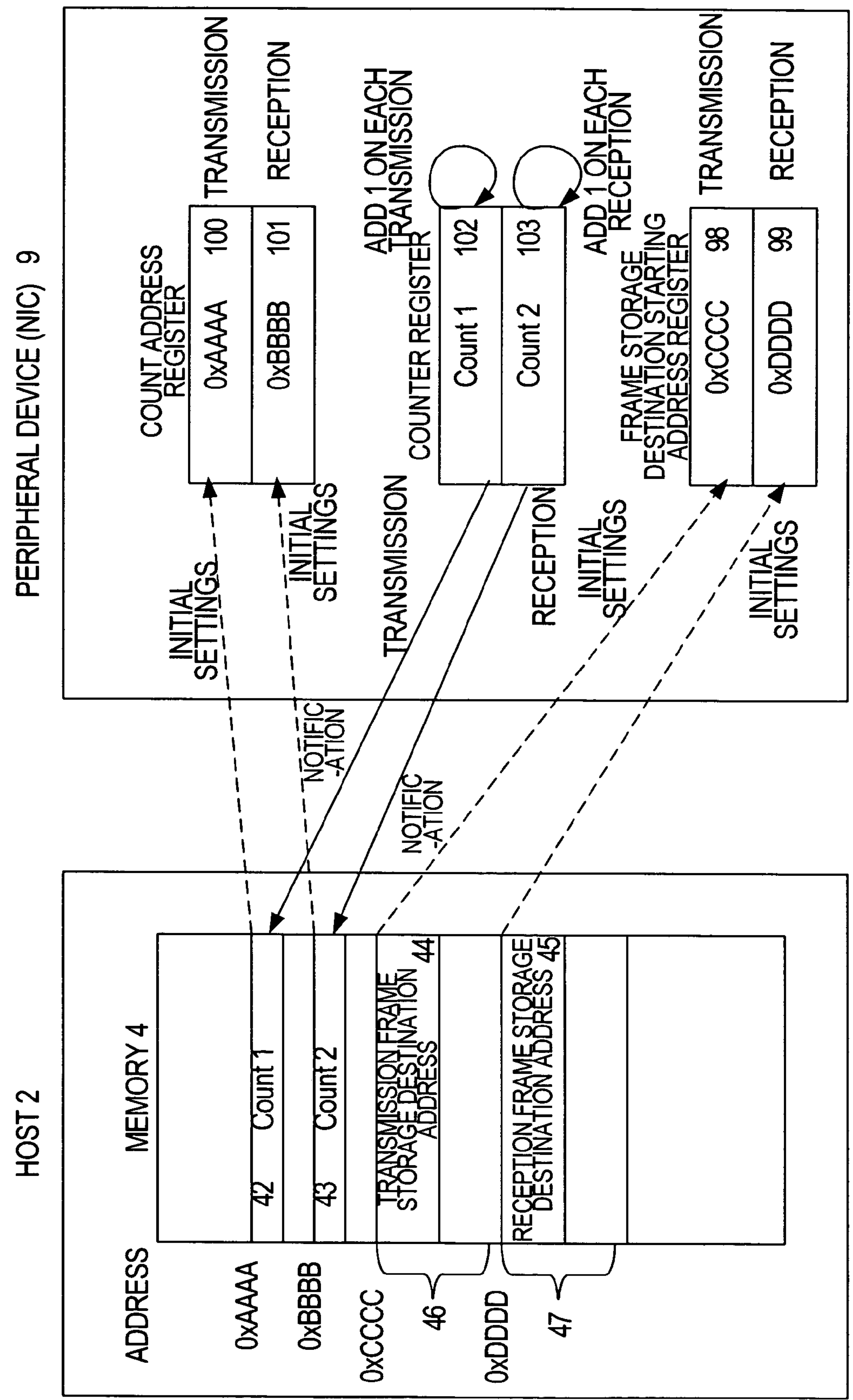
FIG. 6
HOST 2
MEMORY 4
ADDRESS
0xAAAA
0xBBBB
0xCCCC
0xDDDD
42
Count 1
43
Count 2
TRANSMISSION FRAME STORAGE DESTINATION ADDRESS
44
RECEPTION FRAME STORAGE DESTINATION ADDRESS
45
46
47
NOTIFIC -ATION
NOTIFIC -ATION
PERIPHERAL DEVICE (NIC) 9
COUNT ADDRESS REGISTER
0xAAAA
100
TRANSMISSION
0xBBBB
101
RECEPTION
COUNTER REGISTER
Count 1
102
Count 2
103
ADD 1 ON EACH TRANSMISSION
ADD 1 ON EACH RECEPTION
FRAME STORAGE DESTINATION STARTING ADDRESS REGISTER
0xCCCC
98
TRANSMISSION
0xDDDD
99
RECEPTION
INITIAL SETTINGS
INITIAL SETTINGS
TRANSMISSION
RECEPTION
INITIAL SETTINGS
INITIAL SETTINGS

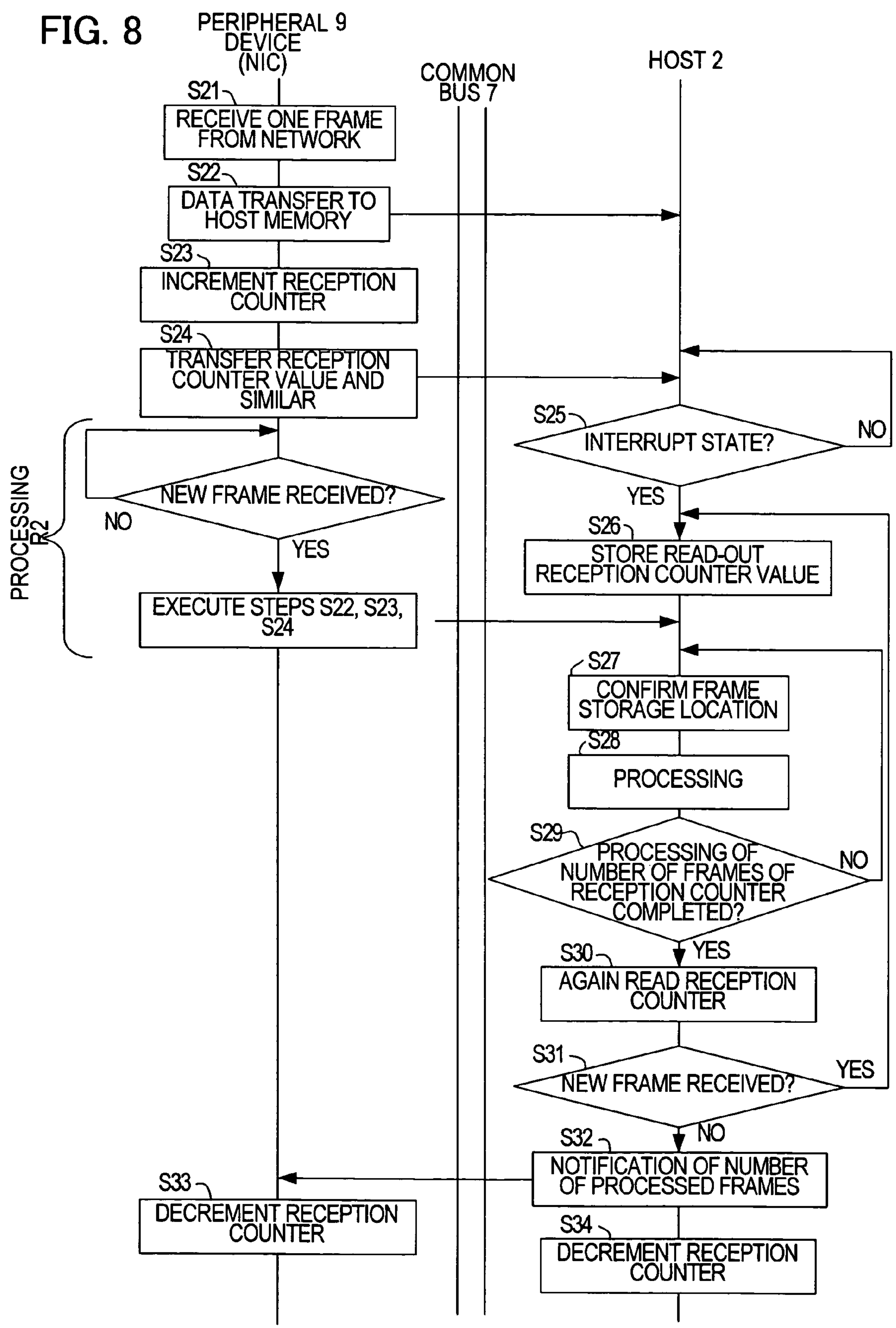
FIG. 8
PERIPHERAL 9 DEVICE (NIC)
COMMON BUS 7
HOST 2
S21
RECEIVE ONE FRAME FROM NETWORK
S22
DATA TRANSFER TO HOST MEMORY
S23
INCREMENT RECEPTION COUNTER
S24
TRANSFER RECEPTION COUNTER VALUE AND SIMILAR
S25
INTERRUPT STATE?
NO
YES
PROCESSING R2
NEW FRAME RECEIVED?
NO
YES
EXECUTE STEPS S22, S23, S24
S26
STORE READ-OUT RECEPTION COUNTER VALUE
S27
CONFIRM FRAME STORAGE LOCATION
S28
PROCESSING
S29
PROCESSING OF NUMBER OF FRAMES OF RECEPTION COUNTER COMPLETED?
NO
YES
S30
AGAIN READ RECEPTION COUNTER
S31
NEW FRAME RECEIVED?
YES
NO
S32
NOTIFICATION OF NUMBER OF PROCESSED FRAMES
S33
DECREMENT RECEPTION COUNTER
S34
DECREMENT RECEPTION COUNTER

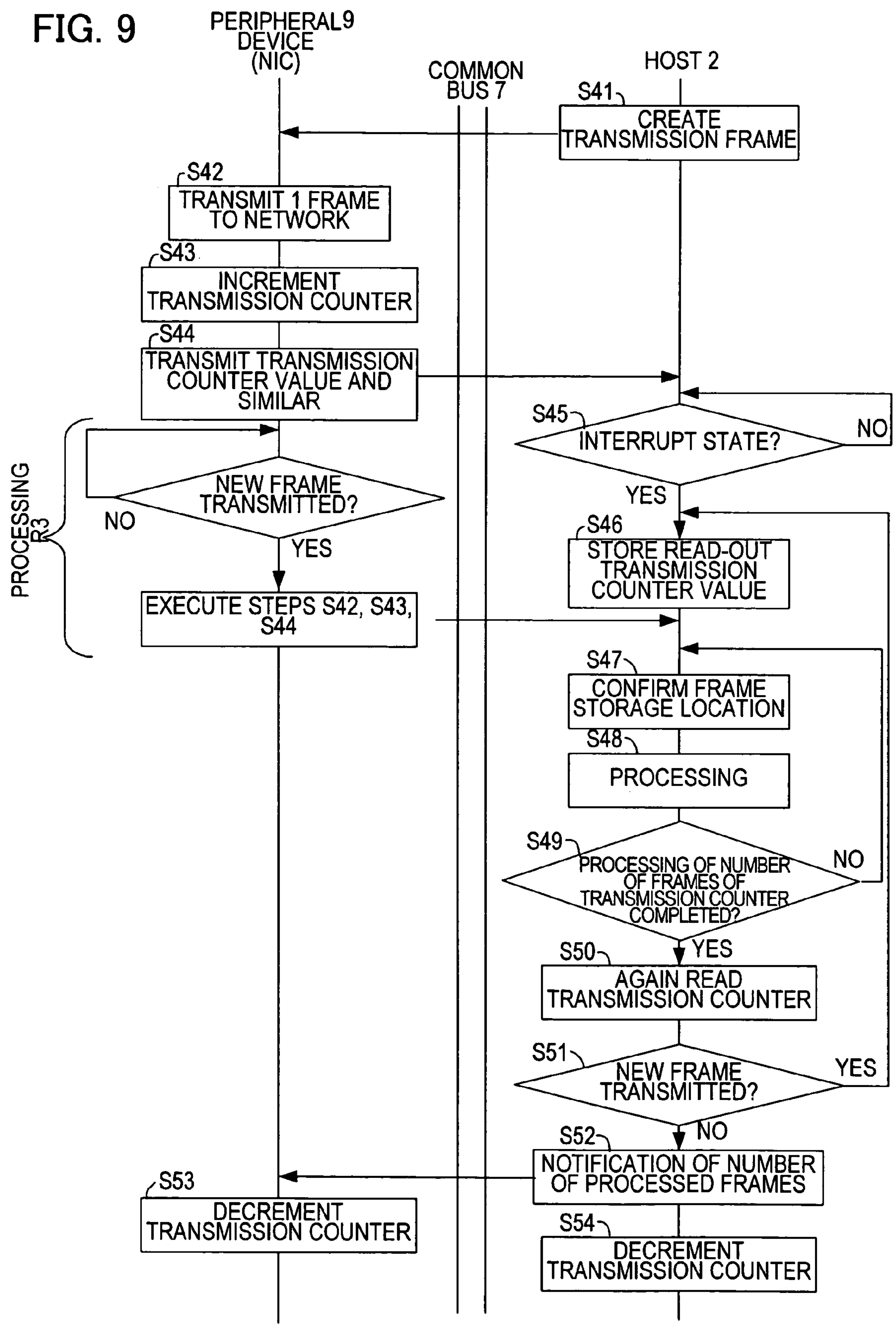
FIG. 9
PERIPHERAL DEVICE (NIC) 9
COMMON BUS 7
HOST 2
S41
CREATE TRANSMISSION FRAME
S42
TRANSMIT 1 FRAME TO NETWORK
S43
INCREMENT TRANSMISSION COUNTER
S44
TRANSMIT TRANSMISSION COUNTER VALUE AND SIMILAR
S45
INTERRUPT STATE?
NO
YES
PROCESSING R3
NEW FRAME TRANSMITTED?
NO
YES
EXECUTE STEPS S42, S43, S44
S46
STORE READ-OUT TRANSMISSION COUNTER VALUE
S47
CONFIRM FRAME STORAGE LOCATION
S48
PROCESSING
S49
PROCESSING OF NUMBER OF FRAMES OF TRANSMISSION COUNTER COMPLETED?
NO
YES
S50
AGAIN READ TRANSMISSION COUNTER
S51
NEW FRAME TRANSMITTED?
YES
NO
S52
NOTIFICATION OF NUMBER OF PROCESSED FRAMES
S53
DECREMENT TRANSMISSION COUNTER
S54
DECREMENT TRANSMISSION COUNTER

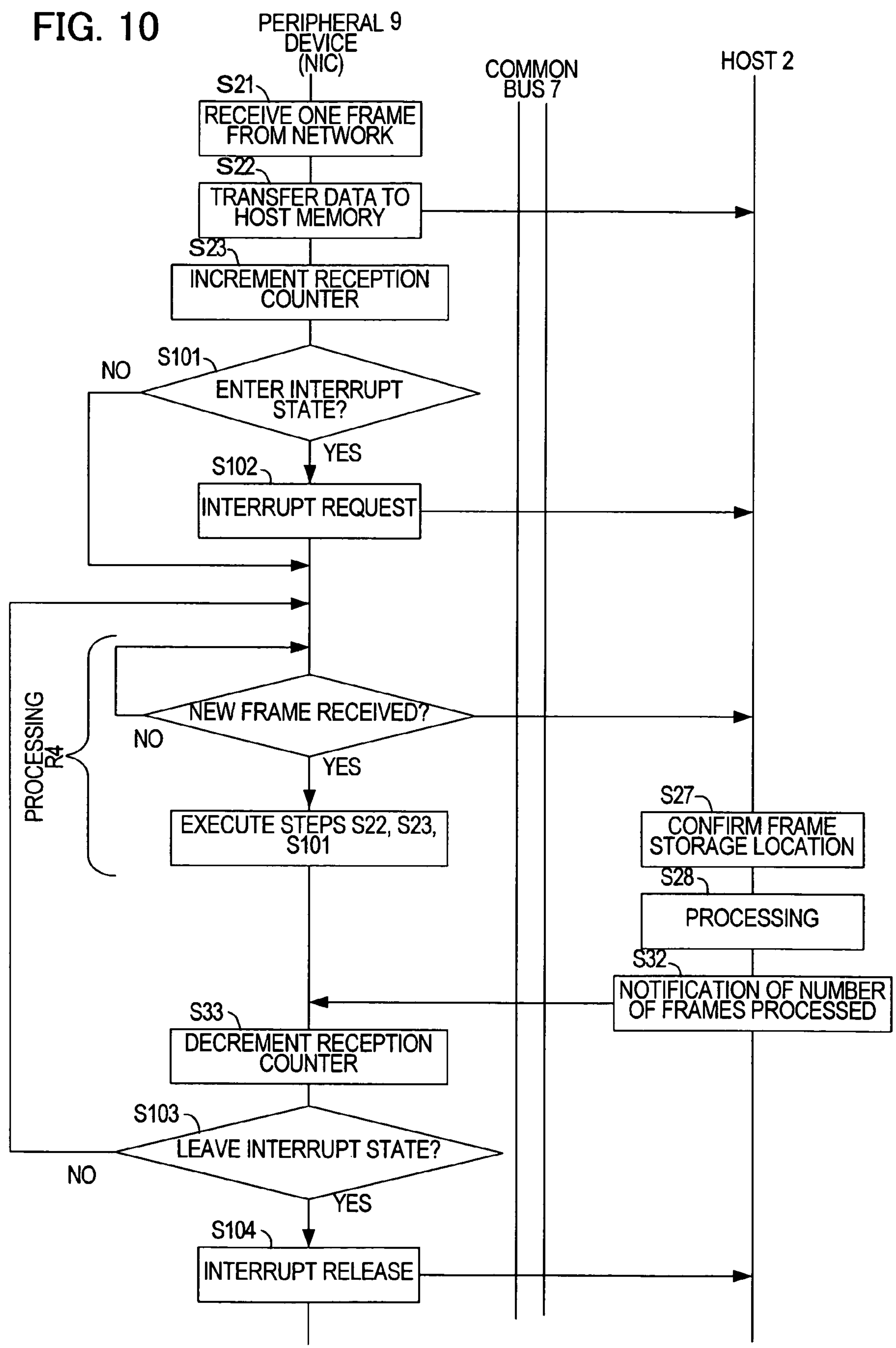
FIG. 10
PERIPHERAL DEVICE (NIC) 9
COMMON BUS 7
HOST 2
S21
RECEIVE ONE FRAME FROM NETWORK
S22
TRANSFER DATA TO HOST MEMORY
S23
INCREMENT RECEPTION COUNTER
S101
ENTER INTERRUPT STATE?
NO
YES
S102
INTERRUPT REQUEST
PROCESSING R4
NEW FRAME RECEIVED?
NO
YES
EXECUTE STEPS S22, S23, S101
S27
CONFIRM FRAME STORAGE LOCATION
S28
PROCESSING
S32
NOTIFICATION OF NUMBER OF FRAMES PROCESSED
S33
DECREMENT RECEPTION COUNTER
S103
LEAVE INTERRUPT STATE?
NO
YES
S104
INTERRUPT RELEASE

DATA TRANSFER PROCESSING METHOD

CROSS-REFERENCE TO RELATED APPLICATIONS

This application is a continuation of international application PCT/JP2003/009852, filed on Aug. 4, 2003.

TECHNICAL FIELD

This invention relates to a data transfer processing method between memory and peripheral device both being provided in an information processing terminal.

BACKGROUND ART

In personal computers and other information processing terminals, a CPU which controls processing in the information processing terminal, a memory in which are stored programs to control the CPU and various data related to control, and other peripheral device which is a network interface card (NIC) and so on, are connected by a signal line (bus). The CPU stores data stored in the peripheral device in the memory, and by accessing the data stored in memory and sending the result of the processing back to the peripheral device, data is transferred between the peripheral device and memory.

FIG. 1 is a block diagram of the configuration of the information processing terminal, used to explain conventional data transfer. In FIG. 1, the CPU 3, which controls processing in the information processing terminal 1, and the memory 4 storing programs to control the CPU 3 and various data relating to control, are connected by a system bus 6 which is faster than a common bus 7. A chipset 5 serves to adjust bus speed differences, via data transfer over the common bus 7 and system bus 6. In this specification, the CPU 3, memory 4, and chipset 5 connected by the system bus 6 are together called a host 2.

The peripheral device (NIC) 9 is one example of the peripheral device connected to the host 2 via the common bus 7, and connects the information processing terminal 1 to a network 10. The common bus 7 can also be connected to other peripheral device 8, such as for example a graphics card, hard disk drive, floppy disk, CD (Compact Disc), DVD (Digital Versatile Disk), MO (Magneto-Optical disc), and various other drives and similar using replaceable media.

In the configuration of FIG. 1, when the NIC 9 receives data from the network 10, the NIC 9 transfers the data to the memory 4 of the host 2, and stores the position (storage address) at which the received data is stored (in the host memory 4). When data transfer is completed, an interrupt request is issued, and an interrupt is sent to the CPU 3. This interrupt processing, which is executed upon completion of transfer to the host memory 4 of data received from the network 10 by the NIC 9, is called an external reception interrupt.

The CPU 3 receives the interrupt request, halts normal processing, and executes the external reception interrupt processing. Here, (1) the CPU 3 confirms the storage address for the received data with the NIC 9, accesses the storage address, and performs processing of the received data. Then, (2) after completion of processing of the received data, the CPU 3 determines from the NIC 9 whether, during the processing of (1), the NIC 9 has further transferred data received from the network to the host memory 4.

If further data transfer is confirmed, the CPU 3 repeats the processing of (1) and (2). Thus in the prior art, when new data is received from the network 10 by the NIC 9 during external reception interrupt processing in processing to transfer data received from the network 10 to the host memory 4, the common bus 7 is used a plurality of times in order for the CPU 3 to perform processing to determine whether data has been received by the NIC 9. Consequently the common bus 7 usage rate for other peripheral device 8 connected to the common bus 7, enabling use in data transfer, is lowered, and there is the problem that the performance of the information processing terminal 1 is degraded.

Further, there is a similar problem when transferring data to be transmitted to the network 10 from the host memory 4 to peripheral device (the NIC) 9. When the NIC 9 transmits a plurality of data sets to the network 10, the NIC 9 stores, in memory provided in the NIC 9 not shown, the original storage address (in the host memory 4) in which the transmission data is stored. When the NIC 9 completes transmission to the network 10 of the first data set, an interrupt is issued, and an interrupt is sent to the CPU 3. The interrupt processing executed when the NIC 9 completes data transmission to the network 10 is called an external transmission interrupt.

Upon receiving the interrupt request, the CPU 3 halts normal processing and performs external transmission interrupt processing. Then, (3) the CPU 3 confirms the storage address of transmission data with the NIC 9, and performs necessary processing. Necessary processing may be, for example, processing to release memory 4 specified by the storage address. Then, (4) after completion of necessary processing, the CPU 3 determines from the NIC 9 whether, during the processing of (3), the NIC 9 has further completed transmission of other data received to the network 10.

If completion of further data transmission is confirmed, the CPU 3 repeats the processing of (3) and (4). Hence in the data transfer processing of the prior art, similarly to cases in which data is received from the network 10, when data is transmitted to the network 10 also, the usage ratio of the common bus 7 which can be used by other peripheral device 8 connected to the common bus 7 for data transfer is lowered, and so there is the problem that performance of the information processing terminal 1 is degraded.

As advanced technology relating to interrupt processing during data transfer, a method has been disclosed of writing to a storage area packets received from the network by a DMA portion provided in the network interface, without passing through the CPU of the host device (Japanese Patent Laid-open No. 2003-87255). However, in Japanese Patent Laid-open No. 2003-87255, there is no mention of alleviation of the degradation in performance due to accessing of the communication interface portion by the CPU via the common bus a plurality of times during interrupt processing after the completion of writing to the storage area.

Further, an infrared ray data transmission method has been disclosed in which, by setting the number of transmission packets in advance, the issuing of interrupts is suppressed until the pre-set number of packets has been transmitted (Japanese Patent Laid-open No. 11-103330). However, in Japanese Patent Laid-open No. 11-103330, there is no mention of alleviation of the degradation in performance due to accessing of peripheral device by the CPU via the common bus a plurality of times in interrupt processing after the end of transfer to memory.

DISCLOSURE OF THE INVENTION

Hence an object of the invention is to alleviate the degradation in performance of an information processing terminal, in data transfer processing with a memory and peripheral device connected by a common bus and provided in the information processing terminal, during accessing a plurality of times of the peripheral device via the common bus by a CPU provided in the information processing terminal.

The above object is attained by providing a data transfer method of a first claim, in an information processing terminal having a memory and peripheral device connected via a common bus, and a CPU for controlling data transfer between the memory and the peripheral device via the common bus, the CPU being capable of accessing the memory without using the common bus, which is a data transfer method between the memory and the peripheral device via the common bus, having a step of updating and storing in the memory the number of times of data transfer, each time data transfer from the peripheral device to the memory is completed; a step of periodically reading the number of times stored in the memory, without using the common bus by the CPU, and of executing, by the CPU, processing of data transferred to the memory when the number of times is equal to or greater than a prescribed number of times; and a step, at a prescribed timing, of subtracting the number of data sets processed up to the timing among the transferred data sets from the number of times, and of updating and storing in the memory.

Further, the above object is attained by providing the data transfer method of the first claim, further having a step in which the number of times stored in the memory is read periodically by the CPU without using the common bus, the number of times previously read is compared with the newly read number of times, and processing of data transferred to the memory is continued when the newly read number of times exceeds the previously read number of times, and processing of data transferred to the memory is ended in other cases.

Further, the above object is attained by providing a data transfer method of a third claim, in an information processing terminal having a memory and peripheral device connected via a common bus, and a CPU for controlling data transfer between the memory and the peripheral device via the common bus, the CPU being capable of accessing the memory without using the common bus, which is a data transfer method between the memory and the peripheral device via the common bus, having a step of updating and storing in the memory the number of times of processing, each time processing of data transferred to the peripheral device from the memory is completed in the peripheral device; a step of periodically reading the number of times stored in the memory, without using the common bus by the CPU, and of executing, by means of the CPU, processing to release an area in the memory in which data transferred to the peripheral device is stored, when the number of times is equal to or greater than a prescribed number of times; and a step, at a prescribed timing, of subtracting the number of data sets for which the release processing has been completed up to the timing from the number of times, and of updating and storing in the memory.

Further, the above object is attained by providing the data transfer method of the third claim, further having a step in which the number of times stored in the memory is read periodically by the CPU without using the common bus, the number of times previously read is compared with the newly read number of times, and release processing of the area in the memory in which data transferred to the peripheral device is stored is continued when the newly read number of times exceeds the previously read number of times, and release processing of the area in the memory in which data transferred to the peripheral device is stored is ended in other cases.

BRIEF DESCRIPTION OF THE DRAWINGS

FIG. 4 is a flowchart showing conventional processing upon data transfer to host memory of data received from the network;

FIG. 5 shows a block diagram of the configuration of an information processing terminal to which a data transfer processing method of this invention is applied;

FIG. 6 explains in summary a data transfer processing method of this invention;

FIG. 8 is a flowchart which explains a first embodiment of the invention;

FIG. 9 is a flowchart which explains a second embodiment of the invention; and, FIG. 10 is a flowchart which explains a third embodiment of the invention.

BEST MODE FOR CARRYING OUT THE INVENTION

Figure 1:
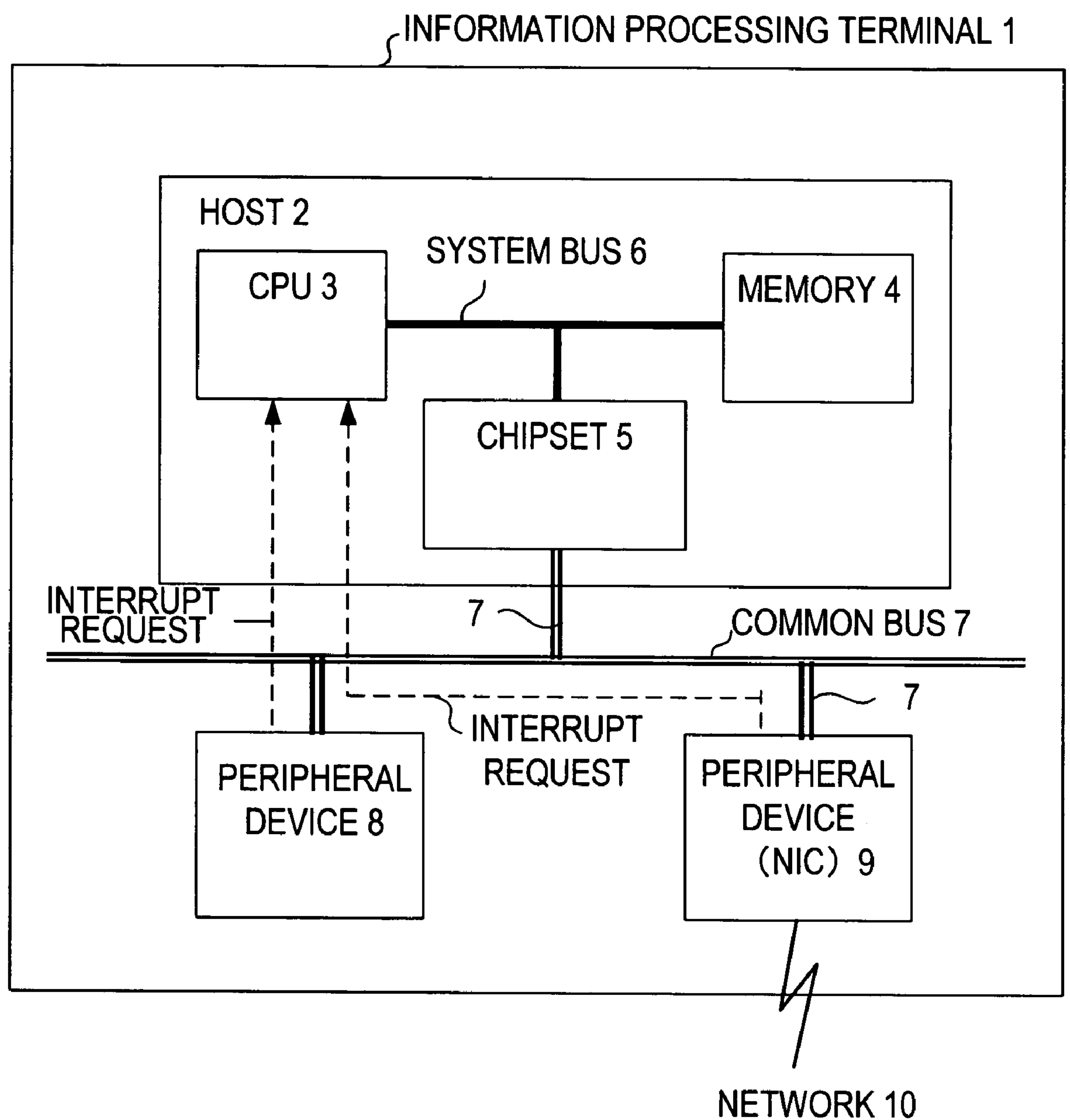
FIG. 1 shows a block diagram of the configuration of an information processing terminal in an example of the prior art.

Below, embodiments of the invention are explained referring to the drawings. However, the technical scope of the invention is not limited to these embodiments.

Prior to explaining the embodiments of the invention, an example of the prior art is explained in greater detail for comparison. Application of the data transfer processing method of this invention is not limited to cases in which the peripheral device is a NIC; here, however, data transfer between the NIC and a memory is explained as one example.

Figure 2:
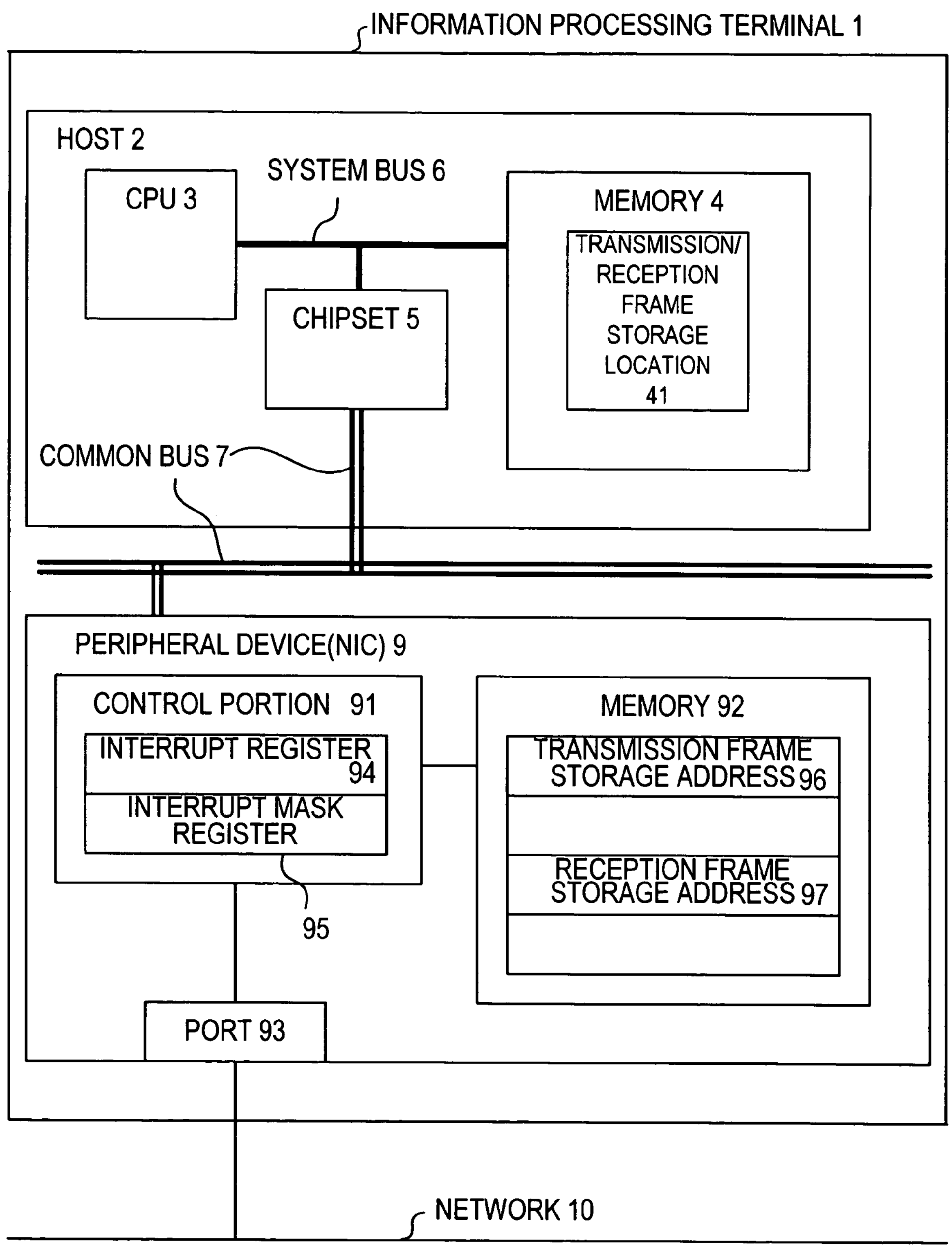
FIG. 2 shows a detailed block diagram of the configuration of an information processing terminal in an example of the prior art.

FIG. 2 describes in detail the information processing terminal of FIG. 1. Hence portions which are the same as in FIG. 1 are assigned the same numbers, and explanations are omitted. In FIG. 2, explanations of a host memory 4 and NIC 9 are added.

In FIG. 2, the host memory 4 includes a transmission and reception frame storage location 41 in which is stored data transmitted and received over a network 10. Data transmitted and received over the network 10 consists of frames, which may for example be an Ethernet frame comprising a 14-byte Ethernet header, 20-byte IP header, 20-byte TCP header, application data, 4-byte Ethernet trailer, or similar.

In the host memory 4, the frame received by the NIC 9 is stored in association with an address indicating a position. Hence when storing (writing) a received frame in the host memory 4, and also when reading a stored frame, an address is specified. The transmission and reception frame storage location 41 is a memory area secured by a specific range of addresses, from a certain address to another address.

The NIC 9 has a control portion 91 which controls the entire NIC 9, this control portion 91 includes an interrupt register 94 and interrupt mask register 95. When "1" is stored in a specific bit of the interrupt register 94, an interrupt request corresponding to the bit is transmitted to the CPU 3. The interrupt cause may be, for example, completion of transfer to the host memory 4 of data received from the network 10 (an external reception interrupt), or completion of transmission of data to the network 10 for which there has been a transmission request (an external-transmission interrupt).

Further, the NIC 9 includes a memory 92 which stores a storage destination address (in the host memory 4) of the transmission and reception frame, and a port 93 which is an interface for connection to the network 10. The memory 92 of the NIC 9 is also used as a buffer for temporary storage of data received from the network 10. In FIG. 3, the behavior of the interrupt register 94 and interrupt mask register 95 when the interrupt request is transmitted is explained.

Figures 3A, 3B:
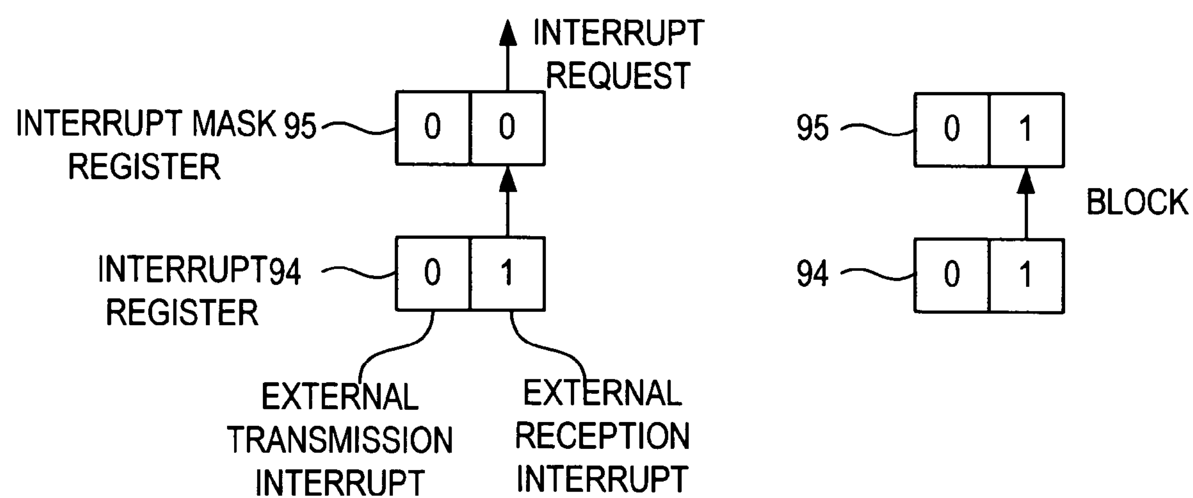
FIG. 3A and FIG. 3B explains the manner of transmission of interrupt requests in an example of the prior art.

FIG. 3 explains the manner of transmission of the interrupt requests from the NIC 9. In FIG. 3, two bits in the registers 94, 95 correspond to the two interrupt causes of the external transmission interrupt and external reception interrupt, and bits corresponding to other interrupt causes are not shown. The same bit positions in the interrupt register 94 and in the interrupt mask register 95 correspond to the same interrupt causes. As shown in FIG. 3A, when the interrupt register 94 is set to "1" and the corresponding interrupt mask register 95 is set to "0", an external reception interrupt request is sent to the CPU 3, but when, as in FIG. 3B, the corresponding interrupt mask register 95 is set to "1", the interrupt request is blocked, and no external reception interrupt request is sent to the CPU 3.

For example, in the case of the external reception interrupt, when in the prior art the CPU 3 executes the external reception interrupt process, "1" is stored in the interrupt mask register 95 corresponding to the external reception interrupt, and thereafter interrupt requests are blocked. Hence the interrupt request is not sent to the CPU 3 even if further data (frames) received from the network 10 are transferred to the host memory 4 during execution of the external reception interrupt processing by the CPU 3. Therefore, after the CPU 3 processed the initial frame (which was the cause of the interrupt processing), the CPU 3 confirms to the NIC 9 via a common bus 7 whether new frames have not been transferred to the host memory 4.

FIG. 4 is a flowchart showing conventional processing when data received from the network 10 is transferred to the host memory 4. In the initial state, the bit corresponding to the external reception interrupt is assumed to be "0" in both the interrupt register 94 and in the interrupt mask register 95. The peripheral device (NIC) 9 receives one frame's worth of data from the network 10 (S1). The control portion 91 buffers received data in the memory 92 as necessary.

The control portion 91 performs data transfer and writes the frame to the host memory 4 (S2), as well as storing the host memory address which specifies storage location of the received frame in a received frame storage destination address 97 (S3), and setting the bit corresponding to external reception interrupts in the interrupt register 94 to "1" (S4). As a result of step S4, the control portion 91 transmits the interrupt request for the external reception interrupt to the CPU 3 (S5) of the host 2.

The CPU 3 receives the interrupt request for the external reception interrupt from the NIC 9, initiates external reception interrupt processing, and firstly performs a mask request to the NIC 9 (S6). At this time, an initial value is set for the number of times (number of iterations) of subsequent processing to confirm reception of a new frame. The number of iterations is set as a variable value in the host memory 4.

The control portion 91 of the NIC 9 receives the mask request, and sets the bit corresponding to external reception interrupts in the interrupt mask register 95 to "1" (S7). As a result of step S7, until the mask is released, external reception interrupts are blocked.

Next, the CPU 3 performs an interrupt release request to the NIC 9 (S8). This indicates that the CPU 3 has begun the interrupt processing to the interrupt request of step S5. The NIC control portion 91 receives the interrupt release request, and returns the bit corresponding to the external reception interrupt in the interrupt register 94 to "0" (S9).

After step S8, the CPU 3 confirms the storage destination of the frame written to the host memory 4 in step S2 (S10). The CPU 3 accesses the address confirmed in step S10, and performs frame processing (S11). The processing of step S11 is processing which differs for each application running on the host 2. For example, when a web browser is used as the application, data contained in an application data of the reception frame as the result of acquisition of a page data from a remote host is formatted and displayed on a display connected to the information processing terminal 1.

While the CPU 3 is performing the processing from step S6 to step S11, the NIC 9 may receives new frames from the network 10. In the NIC 9, the processing from step S2 to step S4 is repeated each time the new frame is received (processing R1 in FIG. 4). That is, each time a new frame is received, the reception frame is written to the host memory 4, and in addition the address at which the reception frame was stored is stored as the reception frame storage destination address in the memory 92 of the NIC 9. The bit corresponding to external reception interrupts in the interrupt register 94 is then held at "1".

Upon completing the processing of step S1, the CPU 3 transmits a confirmation request to confirm to the NIC 9 whether the NIC 9 has further transferred data received from the network 10 to the host memory 4 (S12). The NIC 9 receives the confirmation request of step S12, and returns the value of the interrupt register 94 (S13). The CPU 3 then judges, from the value of the interrupt register 94, whether a new frame has been received (S14).

If in step S9 the interrupt register 94 has been returned to "0", and afterward a new frame has been received, then through the processing of step S4 executed in processing R1, the bit corresponding to external reception interrupts in the interrupt register 94 is again set to "1". If the new frame has not been received, the interrupt register 94 value remains at "0".

Hence in step S14, a judgment can be made, using the value of the interrupt register 94, as to whether the new frame has been received. If in step S14 it is judged that the new frame has been received, execution returns to step S8, and the data (frame) corresponding to the reception frame storage destination address 97 is processed.

Normally, the processing to confirm the new frame is performed a plurality of times. In this embodiment, the number of times confirmation processing is performed is set, in step S6, as a number of iterations. When in step S14 no new frame has been received, the CPU 3 confirms whether the number of iterations is "0" (S15). If the number of iterations is "0", confirmation of the reception of the new frame has been performed the prescribed number of times, and so the CPU 3 returns the number of iterations to the initial value (S16), and transmits a mask release request (S17). As a result, interrupt processing ends. The NIC control portion 91 receives the mask release request, returns the bit corresponding to external reception interrupts in the interrupt mask register 95 to "0" (S18), and prepares for new frame reception. If in step S15 the number of iterations is not "0", the number of iterations is decreased by "1" (S19), execution returns to step S12, and processing is performed to confirm whether the new frame has been received.

Thus in the prior art, after transmission of the external reception interrupt request to the CPU 3, the common bus 7 is used a plurality of times in data communication between the CPU 3 and NIC 9 (from steps S5 to S11, and S12 and S13), and if during processing of a certain frame the new frame is received (processing R1) this confirmation processing (steps S12, S13) entails further the common bus 7 use a plurality of times, so that the usage ratio of the common bus 7 by other peripheral device connected to the common bus 7 is lowered, causing degradation of the performance of the information processing terminal 1.

The flowchart for the case in which transmission of the frame for which there has been the transmission request to the network 10 is completed (external transmission interrupt) similarly, after transmission to the CPU 3 of the external transmission interrupt request, the common bus 7 is used a plurality of times for data communication between the CPU 3 and NIC 9, and when transmission of the new frame is completed during processing of one frame, the common bus 7 is further used a plurality of times for this confirmation processing, so that the usage ratio of the common bus 7 by other peripheral device connected to the common bus 7 is lowered, causing degradation of the performance of the entire information processing terminal 1.

Hence the data transfer processing method of this invention provides the method, after transmission of the interrupt request to the CPU 3, of reducing the number of times the common bus 7 is used for data communication between the CPU 3 and peripheral device 7. To this end, the information processing terminal 1 having a reception counter, the value of which is managed by increasing by the number of frames received when the NIC 9 receives frames from the network 10 and by decreasing by the number of frames processed by the CPU 3, and a transmission counter, the value of which is managed by increasing by the number of frames transmitted when the NIC 9 transmits frames to the network 10 and decreasing by the number of frames processed by the CPU 3, is characterized in that the value of the transmission counter or of the reception counter is referenced to judge whether there are unprocessed frames, and if there are unprocessed frames, interrupt processing is performed.

FIG. 5 is a block diagram of the configuration of the information processing terminal 1 to which a data transfer processing method of this invention is applied. In FIG. 5, portions which are common to the configuration diagram of FIG. 2 are assigned the same numbers, and explanations are omitted. Portions which are different from FIG. 2 are explained.

The host memory 4 includes a transmission counter 42 which stores the number of frames transmitted to the network 10, a reception counter 43 which stores the number of frames received from the network 10, a memory area 46 for storing a plurality of transmission frame storage destination addresses 44, which store a destination addresses at which transmission frames are stored, a memory area 47 for storing a plurality of received frame storage destination addresses 45, which store a destination addresses at which reception frames are stored, and a transmission and reception frame storage location 41, at which the transmission frames and reception frames are stored.

The control portion 91 of the NIC 9 includes a register group, and the register group includes a transmission counter 102, a transmission counter address 100 which stores the address of a transmission counter 42 in the host memory 4, a reception counter 103, a reception counter address 101 which stores the address of a reception counter 43 in the host memory 4, a transmission frame storage destination start address 98 representing the starting address of a memory area 46, and a reception frame storage destination start address 99 representing the starting address of a memory area 47.

Figure 7:
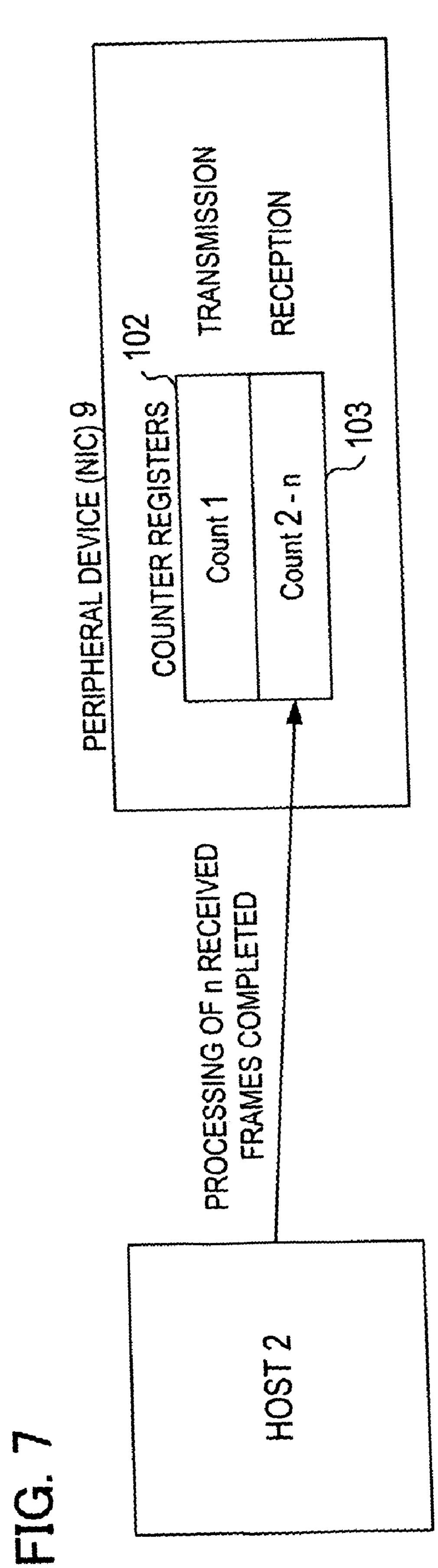
FIG. 7 also explains in summary a data transfer processing method of this invention.

FIG. 6 and FIG. 7 explain in summary a data transfer processing method of this invention. As indicated in FIG. 6, as initial settings, the address (0xAAAA) of the transmission counter 42, the address (0xBBBB) of the reception counter 43, the leading address (0xCCCC) of the memory area 46 in which are stored a plurality of the transmission frame storage destination addresses 44, and the leading address (0xDDDD) of the memory area 47 in which are stored a plurality of the reception frame storage destination addresses 45, are stored in the transmission counter address register 100, reception counter address register 101, transmission frame storage destination starting address register 98, and reception frame storage destination starting address register 99, respectively.

In the peripheral device (NIC) 9, each time data (a frame) is received from the network 10 the value of the reception counter 103 is increased by "1", and the host 2 is notified of the value. The value of the notification is stored at the address in the host memory 4 stored in the reception counter address register 101. Similarly, each time data is transmitted to the network 10, the value of the transmission counter 102 is increased by "1", and the host 2 is notified of the value. The value of the notification is stored at the address in the host memory 4 stored in the transmission counter address register 100.

As shown in FIG. 7, when frame processing is completed on the host side, the peripheral device (NIC) 9 is notified of the number of frames processed, and the value of the corresponding the transmission and reception counter (102, 103) is reduced by the number of frames processed, while at the same time the value of the transmission and reception counter (42, 43) in the host memory 4 is reduced by the number of frames processed. Counter confirmation processing is performed using the system bus 6 of the host 2, and so the common bus 7 is not used. The data of counters transmitted via the common bus 7 is small in size compared with the data transmitted during conventional confirmation processing, and the frequency is also low, so that there is no reduction in the usage ratio of other peripheral device connected to the common bus 7, such as occurs in the prior art.

FIG. 8 is a flowchart explaining the first embodiment of a data transfer processing method of this invention, and describes the processing when data received from the network 10 is transferred to the host memory 4. In the first embodiment, the peripheral device (NIC) 9 is notified in advance of the starting address (0xDDDD in FIG. 5) of the memory area 47 and of the address (0xBBBB in FIG. 5) of the reception counter 43, secured in the host memory 4, and these are stored in the reception frame storage destination starting address 99 and the reception counter address 101, respectively. The reception counter 103 of the NIC 9 is initialized to "0".

First, the peripheral device (NIC) 9 receives one frame's worth of data from the network 10 (S21). The control portion 91 performs data transfer and writes the frame to the host memory 4 (S22), and increments the reception counter 103 (S23). As a result of step S22, the frame is stored in the transmission and reception frame storage location 41. In step S23, the reception counter 103 is increased by "1" each time one frame is received, and here, one frame is received, so that the value of the reception counter 103 becomes "1".

The control portion 91 then transfers the value of the reception counter 103 to the host memory 4, and stores the address, specifying the transmission and reception frame storage location 41 at which the received frame was stored, in the reception frame storage address 45 in the host memory 4 (S24). The NIC control portion 91 references the reception counter address 101, and writes the value of the reception counter 103 to the reception counter 43 of the host memory 4. The NIC control portion 91 writes the addresses of the transmission and reception frame storage locations 41 at which received frames are stored, in order from the reception frame storage destination starting address 99 (in FIG. 5, 0xDDDD is stored). Thus when frames received from the network 10 are transferred to the host memory 4, the host 2 is notified of the number of frames received, and the number is stored in the reception counter 43.

The CPU 3 periodically reads and confirms the value of the reception counter 43, and judges whether an interrupt state exists (S25). In the first embodiment, if the value of the reception counter 43 is "0", there is no interrupt state, and if the value of the reception counter 43 is not "0", the reception counter 43 is managed as if there is an interrupt state, and so functions as the conventional interrupt register. In the example of the prior art, there was a need to perform processing a plurality of times using the common bus 7, including confirmation processing (steps S5 to S9 in FIG. 4), but in this embodiment there is no such need.

When in step S25 it is judged that there is no interrupt state (that is, when the value of the reception counter value 43 is "0"), interrupt processing is not performed. When in step S25 there is judged to be an interrupt state, interrupt processing is begun, and the value of the reception counter 43 read in step S25 is stored (S26).

The reason for performing step S26 is to enable judgement, through comparison with the value upon subsequent reading again of the reception counter 43, as to whether new frames have been transferred to the host memory 4. The value of the reception counter 43 may be stored in the host memory 4 in step S26, or may be stored in a register or other storage means comprised by the CPU 3.

Next, the CPU 3 acquires the received frame storage address (S27). In step S27, addresses, the number of which is the value of the reception counter 43 stored in step S26, are read, starting from the starting address (0xDDDD) of the memory area 47 in the host memory 4.

Then, the CPU 3 accesses the addresses obtained, and performs processing of received frames (S28). As explained in step S11 of FIG. 4 in the example of the prior art, this processing differs for different applications.

When step S28 is finished, the CPU 3 judges whether processing of the number of frames read in step S25 has been completed (S29). In step S29, if processing of the number of the reception counter 43 read in step S25 is not yet completed, execution returns to step S27 and processing is continued, and when processing of the number the reception counter 43 is completed, the reception counter 43 is again read (S30).

While the CPU 3 is performing the processing from step S26 to step S28, the NIC 9 may receiving new frames from the network 10. In the NIC 9, each time a new frame is received, the processing from step S22 to step S24 is repeated (processing R2 in FIG. 8). That is, each time a new frame is received, the frame, the address to which the frame is written, and the reception counter 103 are stored in the host memory 4.

Hence if new frames have been received during the time before the reception counter 43 is again read in step S30, the value of the reception counter 43 read in step S30 will be larger than the value stored in step S26. This fact is utilized to judge whether new frames have been received (S31). In the example of the prior art, processing using the common bus 7 is necessary to determine whether new frames have been received (steps S12, S13 in FIG. 4), but such processing is not necessary.

In step S31, if it is judged that new frames have been received, execution returns to step S26, and frame processing is continued. If it is judged in step S31 that new frames have not been received, the NIC 9 is notified of the number of frames processed up to that time (S32). Here it is sufficient to notify the NIC 9 of the value of the reception counter 43 read in step S30.

The NIC control portion 91 reduces the value of the reception counter 103 by the number of the reception counter as notified in step S32 (S33), and prepares for new frame reception. After step S32, the CPU 3 also reduces the value of the reception counter 43 by the number of frames processed, ends interrupt processing (S34), and prepares for new interrupt processing.

According to the above embodiment, conventional processing of confirming the interrupt state (the conventional processing of steps S5 through S9), which had been performed using the interrupt register 94 and interrupt mask register 95 via the common bus 7, is performed through processing of confirming the reception counter 43 in the host memory 4 (step S25), via the system bus 6 (without using the common bus 7), so that the frequency of use of the common bus 7 can be reduced. Further, in the prior art, the common bus 7 was used for confirmation processing (conventional steps S12, S13) when new frames were transferred during processing, but because the value of the reception counter 43 is updated upon completion of frame transfer to the host memory 4, it is sufficient to determine this value in the host memory 4 through the system bus 6 (step S31), so that the frequency of use of the common bus 7 can be lowered. Moreover, the data other than received frames exchanged over the common bus 7 is the reception counter value and the number of frames processed, the data sizes of which are small, and so this data exchange does not impede use of the common bus 7 by other peripheral device.

FIG. 9 is a flowchart used to explain a second embodiment of a data transfer processing method of this invention, and describes processing when data for transfer to the network 10 is transferred from the host memory 4 to the NIC 9. In this second embodiment, the peripheral device (NIC) 9 is notified in advance of the starting address (0xCCCC in FIG. 5) of the memory area 46 secured in the host memory 4 and of the address (0xAAAA in FIG. 5) of the transmission counter 42, and these are respectively stored in the transmission frame storage destination starting address 98 and in the transmission counter address 100. The transmission counter is initialized to "0".

First, the CPU 3 creates a transmission frame (S41), and instructs the control portion 91 to transmit to the network 10. Created transmission frames differ with the application, for example, a web browser or similar creates TCP/IP packets containing HTTP data. The NIC control portion 91 transmits one transmission frame created in step S41 to the network 10 (S42), and increments the transmission counter 102 (S43). In step S43, the value of the transmission counter 102 is increased by "1" each time one frame is transmitted to the network 10.

The control portion 91 transfers the value of the transmission counter 102, and writes the address of the transmission and reception frame storage location 41 at which the transmission frame is stored to the transmission frame storage destination address 44 (S44). The NIC control portion 91 references the transmission counter address 100 and writes the value of the transmission counter 102 to the transmission counter 42 in the host memory 4.

The NIC control portion 91 writes, in order from the transmission frame storage destination starting address 98 (0xCCCC is stored in FIG. 5), addresses specifying the transmission and reception frame storage locations 41 at which transmission frames have been stored, and which are specified upon instruction by the CPU 3 for transmission to the network 10. When completion of this transmission of frames to the network 10 is completed, the host 2 is notified of the number of transmitted frames, which is stored in the transmission counter 42.

The processing of step S45 and beyond is in essence equivalent to that of step S25 and beyond in FIG. 8, but with "transmission" substituted for "reception". The CPU 3 periodically reads and confirms the value of the transmission counter 42, and judges whether there is an interrupt state (S45). If it is judged in step S45 that there is no interrupt state (that is, if the value of the transmission counter 42 is "0"), interrupt processing is not performed. If in step S45 it is judged that there is an interrupt state, interrupt processing is begun, and the value of the transmission counter 42 read in step S45 is stored (S46).

Next, the CPU 3 acquires the transmission frame storage address (S47). The host 2 then accesses the address obtained, and performs received frame processing (S48). As a result of the processing in step S48, for example, the address specified by the transmission frame storage destination address 44 is released.

When step S48 is completed, the CPU 3 judges whether the number of frames for which processing has been completed is equal to the value of transmission counter 42 read in step S45 (S49). If in step S49 processing of the number of transmission counter 42 read in step S45 is not yet completed, execution returns to step S47 and processing is continued, and if processing of frames in the number of the transmission counter 42 is completed, the transmission counter 42 is again read (S50).

While the CPU 3 is performing the processing of steps S46 to S48, the NIC 9 may transmit new frames to the network 10. Each time the NIC 9 transmits the new frame, the processing from step S42 to step S44 is repeated (processing R3 in FIG. 7). That is, an address specifying the storage location at which the transmission frame is stored, and the transmission counter 42, are stored in the host memory 4 each time the new frame is transmitted.

Hence if the new frame are transmitted during the time until the transmission counter 42 is again read in step S50, then the value of the transmission counter 42 read in step S50 is larger than the value stored in step S46. Using this fact, a judgment is made as to whether the new frame have been transmitted (S51). In step S51, if it is judged that the new frame have been transmitted, execution returns to step S46, and frame processing is continued.

When in step S51 it is judged that no new frame have been transmitted, the NIC 9 is notified of the number of frames processed up to that time (S52). Here it is sufficient to notify the NIC 9 of the value of the transmission counter 42 read in step S50. The NIC control portion 91 subtracts the number of the transmission counter 42 of the notification in step S52 from the value in the transmission counter 102 (S53), and prepares for new frame transmission. After step S52, the CPU 3 also reduces the value of the transmission counter 42 by the number of frames processed, ends interrupt processing (S54), and prepares for new interrupt processing.

Through the above second embodiment, advantageous results similar to those of the first embodiment are obtained. That is, conventional processing to confirm the interrupt state, which had been performed using the interrupt register 94 and interrupt mask register 95 via the common bus 7, is performed through processing to confirm the transmission counter 42 in the host memory 4 (step S45), via the system bus 6 (without using the common bus 7), so that the frequency of use of the common bus 7 can be reduced. Further, in the prior art, the common bus 7 was used for confirmation processing when new frames were transferred during processing, but because the value of the transmission counter 42 is updated upon completion of frame transmission to the network, it is sufficient to determine this value in the host memory 4 through the system bus 6 (step S51), so that the frequency of use of the common bus 7 can be lowered. Moreover, in this embodiment the data other than transmission frames exchanged over the common bus 7 is the values of the transmission counters and the number of frames processed, the data sizes of which are small, and so this data exchange does not impede use of the common bus 7 by other peripheral device.

In the above first and second embodiment, the interrupt state is judged by the CPU 3 by judging the transmission and reception counter (42, 43) values in notifications to the host memory 4, but by employing means of transmitting an interrupt request to the CPU 3 when the values of the transmission and reception counters (102, 103) in the peripheral device (NIC) 9 are no longer zero, and of transmitting interrupt release requests when the transmission and reception counter (102, 103) values are again zero, the CPU 3, after receiving the interrupt request, can perform interrupt processing, assuming an interrupt state, until the interrupt release request is received. In this case, there is no need to store a transmission counter value 42 and reception counter value 43 in the host memory 4. In the following third embodiment, processing when data received from the network 10 is transferred to the host memory 4 is explained.

FIG. 10 is a flowchart used to explain a third embodiment of the invention. In the third embodiment also, in order to perform management similar to that of the first and second embodiments, the value of the reception counter 103 indicates the number of unprocessed frames. The third embodiment is similar to the first embodiment (FIG. 8), and so the same step numbers are assigned to the same steps, and explanations are omitted. First, the peripheral device (NIC) 9 receives one frame's worth of data from the network 10 (S21). The control portion 91 performs data transfer, and writes the frame to the host memory 4 (S22), as well as incrementing the reception counter 103 (S23). This is the same as processing in FIG. 6.

Next, the control portion 91 judges whether to enter an interrupt state (S101). In step S101, the judgment is made as to whether an interrupt state already exists, or whether an interrupt state is to be entered for the first time. This judgment is made after the reception counter 103 has been incremented, and so if the value of the reception counter 103 is "1", then an interrupt state is entered for the first time. Hence if the value of the reception counter 103 is "1", processing for the "NO" result is performed, and the interrupt request is transmitted (S102), but if the value of the reception counter 103 is other than "1", step S102 is omitted, and no action is taken.

After step S102, the NIC 9 may receive new frames from the network 10. In the NIC 9, the processing of steps S22, S23, and S101 (processing R4 in FIG. 10) is repeated each time the new frame is received. That is, each time the new frame is received, the frame and the write address are stored in the host memory 4, and an interrupt state judgment is performed.

Next, the CPU 3 acquires the received frame storage address (S27), and the host 2 accesses the address obtained and performs processing for the received frame (S28). The processing of steps S27 and S28 is repeated for the number of addresses stored in the memory area 47. The NIC 9 is then notified of the number of processed frames (S32).

The NIC control portion 91 subtracts the value of the reception counter 103 of the notification in step S32 from the value of the reception counter 103 (S33), and again judges whether the interrupt state exists (S103). Here, a judgment is made as to whether to leave the interrupt state. If the value of the counter 103 after subtraction is not zero, then there are no remaining frames to be processed. Hence if the value of the counter 103 after subtraction is zero, execution proceeds to "NO" in step S103, the interrupt is released (S104), and if the value of the counter 103 is not zero, preparations are made for new frame reception. The CPU 3 detects release of the interrupt and ends interrupt processing, and the normal processing which had been halted is resumed.

By using the peripheral device control portion 91 as means for maintaining the interrupt state while the value of the reception counter 103 is not zero, and for releasing the interrupt state when the value becomes zero, similarly to the first and second embodiments, the data processing method can be provided in which processing which uses the common bus 7 can be reduced compared with the prior art, so that the common bus 7 usage ratio by other peripheral device is not impeded.

In the third embodiment, conventional processing to determine from the NIC 9, via the common bus 7, the storage locations of received frames, is accomplished merely by referencing the host memory 4. Further, the reception counter 103 is used to judge the interrupt state, so that again access via the common bus can be reduced. The third embodiment concerns processing upon reception of data from the network 10, but this invention can be applied, in a manner similar to the third embodiment, to cases of transmission of data to the network 10.

Thus in this invention, processing which, in conventional data transfer processing, entails the use of the common bus 7 when performing (1) processing to confirm the interrupt state, performed via the common bus 7 employing the interrupt register 94 and interrupt mask register 95, and (2) confirmation processing performed when new frames are transferred during processing, can be performed without using the common bus 7. By thus reducing the frequency of access via the common bus 7 in data transfer processing, there is no reduction in the usage ratio of the common bus 7 by other peripheral device 9 connected to the same common bus 7 as certain peripheral device. As a result, the performance of the information processing terminal 1 as a whole is not degraded. Further, even if there is currently only the single peripheral device unit connected to the common bus 7, degradation of the performance of the information processing terminal 1 upon future addition of other peripheral device can be avoided.

In these embodiments, the invention was applied to cases in which NICs 9 in particular are the peripheral device, but this invention can be applied to any cases in which, upon completion of data transfer from peripheral device to host memory 4, or upon completion of processing of data transferred from host memory 4 to the peripheral device, an interrupt is issued to the CPU 3, and the CPU 3 determines from the peripheral device whether new data has been transferred to the host memory 4, or whether new data has been transferred from the host memory 4, during the execution of interrupt processing.

INDUSTRIAL APPLICABILITY

By applying a data transfer processing method of this invention to an information processing terminal in which, when performing data transfer between a memory and peripheral device via a common bus, an interrupt request is issued to a CPU after the completion of data transfer to the memory or after the completion of processing of data transferred from the memory, the degradation of information processing performance accompanying data transfer processing can be prevented. Moreover, even if there is currently only a single peripheral device unit connected to the common bus, degradation of the performance of the information processing terminal upon future addition of other peripheral device can be avoided.

The scope of protection of this invention is not limited to the above embodiments, but extends to the inventions described in the claims, and to inventions equivalent thereto.

The invention claimed is:

1. A data transfer method, in an information processing terminal having a memory and peripheral device connected via a common bus, and a CPU for controlling date transfer between said memory and said peripheral device via said common bus, said CPU being capable of accessing said memory without using said common bus, which is a method of data transfer between said memory and said peripheral device via said common bus, the method comprising:

updating and storing in said memory the number of times of data transfer, each time data transfer from said peripheral device to said memory is completed;

periodically reading said number of times stored in said memory, by means of said CPU without using said common bus, and of executing, by means of said CPU, processing of data transferred to said memory when said number of times is equal to or greater than a prescribed number of times; and subtracting, at a prescribed timing, the number of data sets processed up to the timing among said transferred data sets from said number of times, and of updating and storing in said memory;

wherein said number of times stored in said memory is read periodically by said CPU without using said common bus, said number of times previously read in the updating and storing is compared with the number of times read periodically, and processing of data transferred to said memory is continued when said periodically read number of times exceeds said previously read number of times, and processing of data transferred to said memory is ended in other cases.

2. A data transfer method, in an information processing terminal having a memory end peripheral device connected via a common bus, and a CPU for controlling data transfer between said memory and said peripheral device via said common bus, said CPU being capable of accessing said memory without using said common bus, which is a method of data transfer between said memory and said peripheral device via said common bus, comprising the steps of:

updating and storing in said memory the number of times of processing of data transferred from said memory to said peripheral device, each time said processing is completed in said peripheral device;

periodically reading said number of times stored in said memory, by means of said CPU without using said common bus, and of executing, by means of said CPU, processing to release an area in said memory in which data transferred to said peripheral device is stored, when said number of times is equal to or greater than a prescribed number of times; and subtracting, at a prescribed timing, the number of data sets for which said release processing has been completed up to the timing from said number of times, and of updating and storing in said memory;

wherein said number of times stored in said memory is read periodically by said CPU without using said common bus, said number of times previously read in the updating and storing is compared with the number of times read periodically, and processing of data transferred to said memory is continued when said periodically read number of times exceeds said previously read number of times, and processing of data transferred to said memory is ended in other cases.

* * * * *

UNITED STATES PATENT AND TRADEMARK OFFICE

CERTIFICATE OF CORRECTION

PATENT NO. : 7,353,298 B2
APPLICATION NO. : 11/344160
DATED : April 1, 2008
INVENTOR(S) : Kazumi Hayasaka It is certified that error appears in the above-identified patent and that said Letters Patent is hereby corrected as shown below:

Column 14, Line 34, change "date" to --data--.

Column 14, Line 63, change "end" to --and--.

Signed and Sealed this

Nineteenth Day of August, 2008

JON W. DUDAS
*Director of the United States Patent and Trademark Office*

UNITED STATES PATENT AND TRADEMARK OFFICE

CERTIFICATE OF CORRECTION

PATENT NO. : 7,353,298 B2
APPLICATION NO. : 11/344160
DATED : April 1, 2008
INVENTOR(S) : Kazumi Hayasaka It is certified that error appears in the above-identified patent and that said Letters Patent is hereby corrected as shown below:

Column 14, Line 34, change "date" to --data--.

Column 14, Line 63, change "end" to --and--.

Signed and Sealed this

Ninth Day of September, 2008

JON W. DUDAS
*Director of the United States Patent and Trademark Office*